United States Patent
Hama

(10) Patent No.: US 8,494,971 B2
(45) Date of Patent: Jul. 23, 2013

(54) SYSTEM, METHOD, AND PROGRAM FOR EDITING PRODUCTION SCHEDULE

(75) Inventor: Toshiyuki Hama, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 567 days.

(21) Appl. No.: 12/422,460

(22) Filed: Apr. 13, 2009

(65) Prior Publication Data

US 2009/0259694 A1 Oct. 15, 2009

(30) Foreign Application Priority Data

Apr. 15, 2008 (JP) ................... 2008-105474

(51) Int. Cl.
*G06Q 10/00* (2012.01)
(52) U.S. Cl.
USPC ......................................................... 705/301
(58) Field of Classification Search
USPC ......................................................... 705/301
See application file for complete search history.

(56) References Cited

U.S. PATENT DOCUMENTS

| | | | | |
|---|---|---|---|---|
| 5,751,958 | A * | 5/1998 | Zweben et al. | 709/204 |
| 6,996,601 | B1 * | 2/2006 | Smith | 709/203 |
| 7,983,923 | B1 * | 7/2011 | Schlaak et al. | 705/1.1 |
| 2005/0278209 | A1 * | 12/2005 | Kayahara et al. | 705/8 |
| 2007/0282651 | A1 * | 12/2007 | Naik et al. | 705/8 |
| 2008/0126165 | A1 * | 5/2008 | Buchner | 705/8 |

FOREIGN PATENT DOCUMENTS

| | | |
|---|---|---|
| JP | 3196201 A | 8/1991 |
| JP | 7334572 A | 12/1995 |
| JP | 8203794 A | 8/1996 |
| JP | 8264405 A | 10/1996 |
| JP | 9156506 A | 6/1997 |
| JP | 9186056 A | 7/1997 |
| JP | 9-249903 | 9/1997 |
| JP | 10268909 A | 10/1998 |
| JP | 11224292 A | 8/1999 |
| JP | 2002-149223 | 5/2002 |
| JP | 2004038326 A | 2/2004 |
| JP | 2005275958 A | 10/2005 |

* cited by examiner

*Primary Examiner* — Dennis Ruhl
(74) *Attorney, Agent, or Firm* — Cantor Colburn LLP; Dwayne Nelson

(57) ABSTRACT

A system, method, and computer program for editing a production schedule. The system includes: a storage unit storing master data; a receiving unit receiving the master data; a duplicating unit generating editing data; an editing operation unit generating preliminarily-edited data based on an editing command; an identification unit identifying an item edited in the preliminarily-edited data with respect to the master data; a determination unit determining whether the inputted editing command is valid or invalid, wherein tag information is appended to an item being the same as the edited item; and an updating unit generating the preliminarily-edited data in which the editing command determined to be valid is reflected and to which the tag information is appended and updating the master data by using the generated preliminarily-edited data. A method and computer program are also provided.

16 Claims, 13 Drawing Sheets

(Production Schedule Master Data)

(Production Schedule Editing Data)

(Production Schedule Preliminarily-Edited Data)

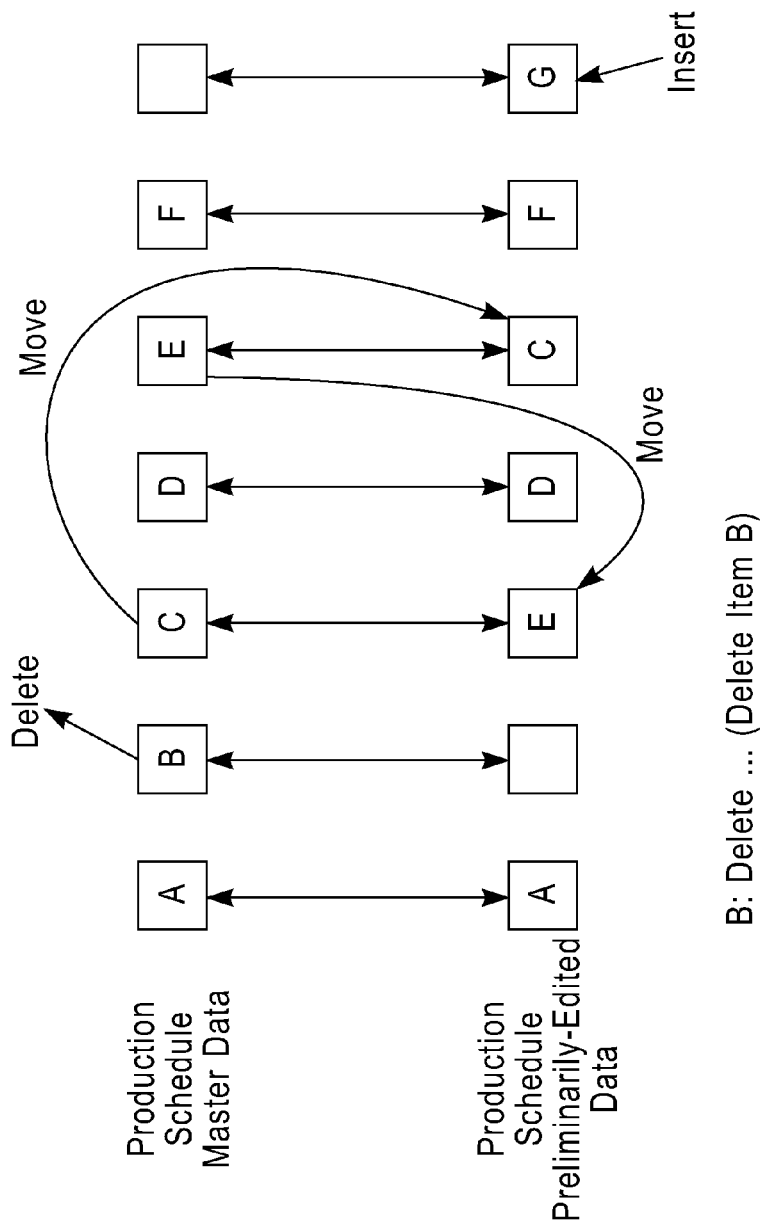

[Valid/Invalid Determination Table]

By Editor     T2(#1)

| Editor | Priority |
|---|---|
| Editor A | 1 |
| Editor B | 2 |
| Editor C | 1 |
| Editor D | 2 |
| Editor E | 3 |

FIG. 8A

By Schedule     T2(#2)

| Schedule | Priority |
|---|---|
| 8:00~9:00 | 1 |
| 9:00~10:00 | 2 |
| 11:00~12:00 | 3 |
| 12:00~13:00 | 4 |
| 13:00~14:00 | 5 |
| 15:00~16:00 | 6 |
| 17:00~18:00 | 7 |
| 18:00~19:00 | 8 |
| 19:00~20:00 | 9 |
| 20:00~21:00 | 10 |
| 21:00~22:00 | 11 |

FIG. 8B

By Production Line     T2(#3)

| Production Line | Priority |
|---|---|
| a | 1 |
| b | 5 |
| c | 2 |
| d | 3 |
| e | 4 |

FIG. 8C

[Valid/Invalid Determination For Editing Command]

i) By Editor
1. Regarding "J: Insert [A]"
   Determination Is Impossible Because Editor D
   = Editor B In Priority Order
2. Regarding "K: Delete"
   Determined To Be Invalid Because Editor D
   < Editor A in Priority Order
3. Regarding "H: Move [G]"
   Determined To Be Valid Because Editor D
   > Editor E In Priority Order ii) By Schedule
1. Regarding "J: Insert [A]"
   Determined To Be Valid Because Priority Is Higher
2. Regarding "K: Delete"
   Determination Is Impossible Because Priorities Are Equal
3. Regarding "H: Move [G]"
   Determined To Be Invalid Because Priorities Are Lower iii) By Production Line
1. Regarding "J: Insert [A]," "K: Delete," "H: Move [G]"
   Determined To Be Valid Because Line a
   > Line e In Priority Order

FIG. 10

SYSTEM, METHOD, AND PROGRAM FOR EDITING PRODUCTION SCHEDULE

CROSS-REFERENCE TO RELATED APPLICATIONS

This application claims priority under 35 U.S.C. §119 from Japanese Patent Application No. 2008-105474 filed Apr. 15, 2008, the entire contents of which are incorporated herein by reference.

BACKGROUND OF THE INVENTION

1. Field of the Invention

The present invention relates to a system, a method, and a program for editing a production schedule. Each of these receives an editing operation to be performed on production schedule data showing multiple items chronologically arranged therein.

2. Description of Related Art

In general, a planning section draws up a production schedule for manufacturing products from raw materials in a plant. For example, in an iron foundry there are various production processes, such as, a receiving process of raw materials including iron ore, an iron making process, a steel making process, a casting process, a rolling process, and a shipping process. The planning section draws up a production schedule indicating the order of processing products (including semi-finished products) in each of the production processes.

In a production schedule, items indicating products (including semi-finished products) are chronologically arranged. Examples of production schedules include the order of casts in a steel making process, the order of charges in a cast, the order of cycles in a hot-rolling process, the order of slabs in a cycle, and the order of slabs in a charge.

There is a prior art for assisting a planning section to draw up a production schedule. Hereinafter, examples of such prior art will be described.

Japanese Patent Application Publication No. Hei. 9-249903 proposes a scheduling method of demand and supply management for molten iron. In this scheduling method, based on demand conditions for molten iron in a steel making process on the demand side, operation conditions are set up for an iron making process that is an upstream process of the steel making process. In this way, an operating schedule in which an upstream process and a downstream process are swapped with each other is drawn up. This operation scheduling method makes it possible to draw up a schedule for demand and supply management for molten metal with high precision.

Japanese Patent Application Publication No. 2002-149223 proposes a production management support system. In this production management support system a processing route for a product is determined upon receipt of a product order from order input means. Then, based on the lead time and efficiency of the determined processing route, the delivery date for each process and the capability balance between processes are adjusted. This production management support system makes it possible to prepare an accurate production schedule in a short time.

Meanwhile, it would be convenient if a planning section can accept correction (edit) in a production schedule once prepared appropriately in accordance with a change in operation, and the like.

In general, even when a planner prepares a production schedule in accordance with an order of an orderer, the product produced on the basis of the production schedule may sometimes not satisfy the quantity or quality demanded by the orderer due to an occurrence of change in operation or the like.

In such case, the planner needs to correct (edit) the production schedule once prepared in order to satisfy the quantity or quality demanded by the orderer.

Because an order may consist of a huge number of items, a production schedule is sometimes edited by multiple planners. In this case, some of the multiple planners may insert, delete, or move the same item in the production schedule. As a result, so-called editing conflicts in which multiple editors simultaneously edit the same item occur.

In order to deal with such problems it has been considered to set a so-called preliminary assignment by which each of multiple editors is assigned, in advance, a limited section of a production schedule so as to be authorized to edit only his/her section.

However, such an approach is manually conducted in general and thus has a disadvantage because an opportunity for optimal scheduling may be missed. For this reason, such an additional condition as the preliminary assignment should be better omitted as much as possible.

SUMMARY OF THE INVENTION

It is an object of the present invention to appropriately edit, in accordance with a change in operation and the like, a production schedule that has been prepared. It is also an object of the present invention to appropriately deal with so-called editing conflicts in which multiple editors edit the same item.

In order to solve these problems, exemplary embodiments of the present invention provide a system, a method, and a program for editing a production schedule, each configured as follows.

Accordingly, a system for editing a production schedule is provided. The system includes: a storage unit for storing production schedule master data; a receiving unit for receiving the production schedule master data; a duplicating unit for generating production schedule editing data by duplicating the production schedule master data; an editing operation unit for generating production schedule preliminarily-edited data by editing an item in the production schedule editing data on the basis of an inputted editing command; an identification unit for identifying an item edited in the production schedule preliminarily-edited data with respect to the production schedule master data on the basis of the production schedule preliminarily-edited data and the production schedule master data; a determination unit for determining whether the inputted editing command is valid or invalid in a case where, among items in the production schedule master data, tag information is appended to an item that is the same as the edited item; and an updating unit for generating the production schedule preliminarily-edited data in which the editing command determined to be valid by the determination unit is reflected and to which the tag information is appended, wherein the updating unit updates the production schedule master data by using the generated production schedule preliminarily-edited data, thereby producing an edited production schedule.

Also provided is a method for editing a production schedule, which includes the steps of: receiving production schedule master data; duplicating the production schedule master data to generate production schedule editing data; editing items in the production schedule editing data on the basis of an inputted editing command to generate production schedule preliminarily-edited data; identifying an item edited in the production schedule preliminarily-edited data with respect to the production schedule master data on the basis of the production schedule preliminarily-edited data and the production schedule master data; determining whether the inputted editing command is valid or invalid in a case where, among items in the production schedule master data, tag information is appended to an item that is the same as the edited production schedule; and updating the production schedule master data by using the generated production schedule preliminarily-edited data in which the editing command determined to be valid is reflected and to which the tag information is appended, thereby producing an edited production schedule.

Also provided is a computer program product tangibly embodying computer readable instructions which when implemented causes a computer to execute the steps of the above method.

BRIEF DESCRIPTION OF THE DRAWINGS

For a more complete understanding of the present invention and the advantages thereof, reference is now made to the following description taken in conjunction with the accompanying drawings.

FIG. 7 shows an editing command line in a case where item input forms are fixed.

FIG. 8 shows an overview of a valid/invalid determination table.

FIG. 10 shows an overview of the process of determining whether each editing command is valid or invalid.

DETAILED DESCRIPTION OF THE PREFERRED EMBODIMENT

In the present invention, production schedule editing data is generated through duplication of production schedule master data. The editing of an item according to an editing command inputted by an editor is made on the production schedule editing data thus generated. An item to be edited is specified. Whether the updating of the item thus specified is valid or invalid is determined on the basis of the presence or absence of tag information appended to an item in the production schedule master data. Then, production schedule preliminarily-edited data in which only an editing command determined to be valid is reflected, and to which tag information is appended, is generated. After that, the production schedule master data is updated by use of the generated production schedule preliminarily-edited data.

The preferred embodiments of the present invention are described with reference to the drawings.

Figure 1:
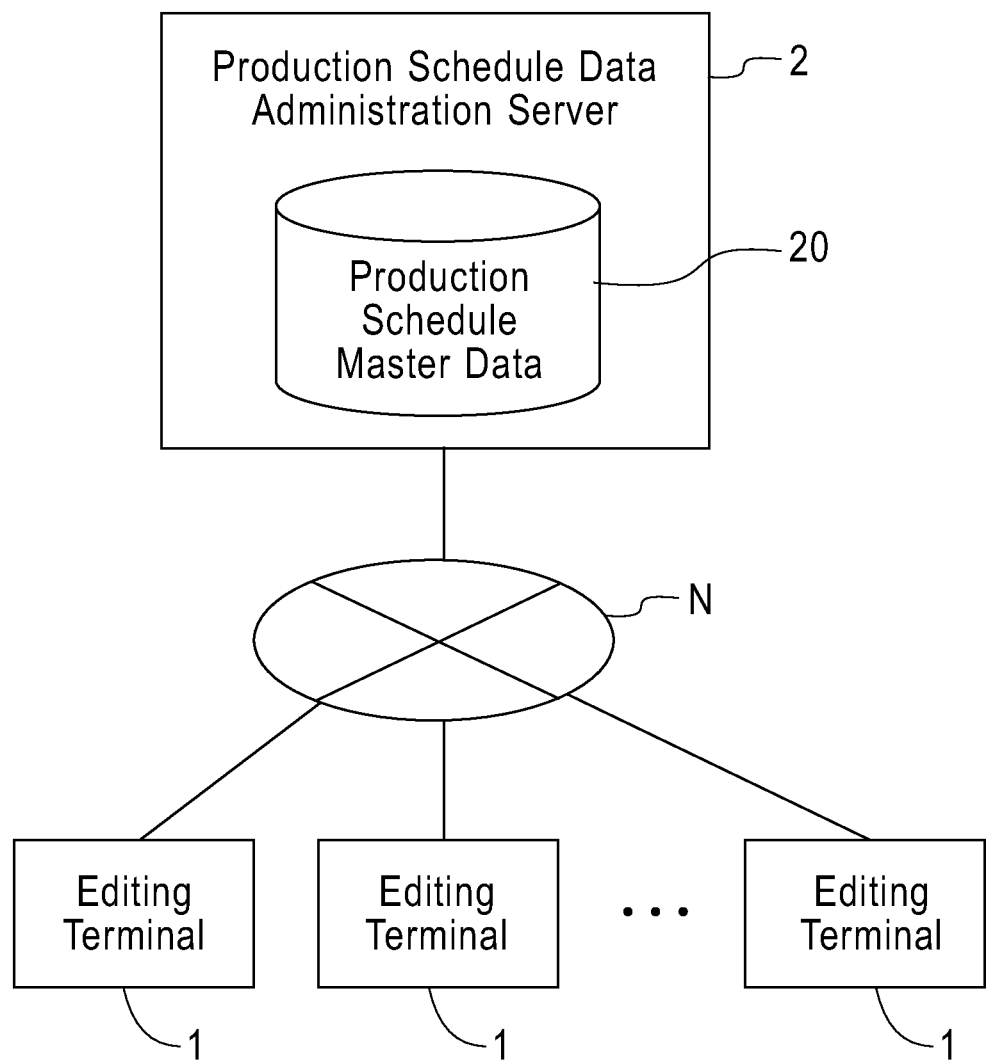
FIG. 1 is a diagram showing an entire configuration of a system for editing a production schedule according to an embodiment.

FIG. 1 is a diagram showing an entire configuration of a system for editing a production schedule according to an embodiment. An editing terminal 1 and a production schedule data administration server 2, each of which is configured of a computer or the like, are connected to each other through a communication network 3, such as the Internet.

The editing terminal 1 and the production schedule data administration server 2 communicate with each other in accordance with a predetermined communication protocol. The production schedule data administration server 2 includes production schedule master data 20.

The production schedule data administration server 2 stores the production schedule master data 20 in a database for production schedule master data. Note that, the production schedule master data 20 corresponds to a storage unit. The editing terminal 1 communicates with the production schedule data administration server 2, thereby enabling an editing operation to be performed on the production schedule master data 20 stored in the production schedule data administration server 2.

Figure 2:
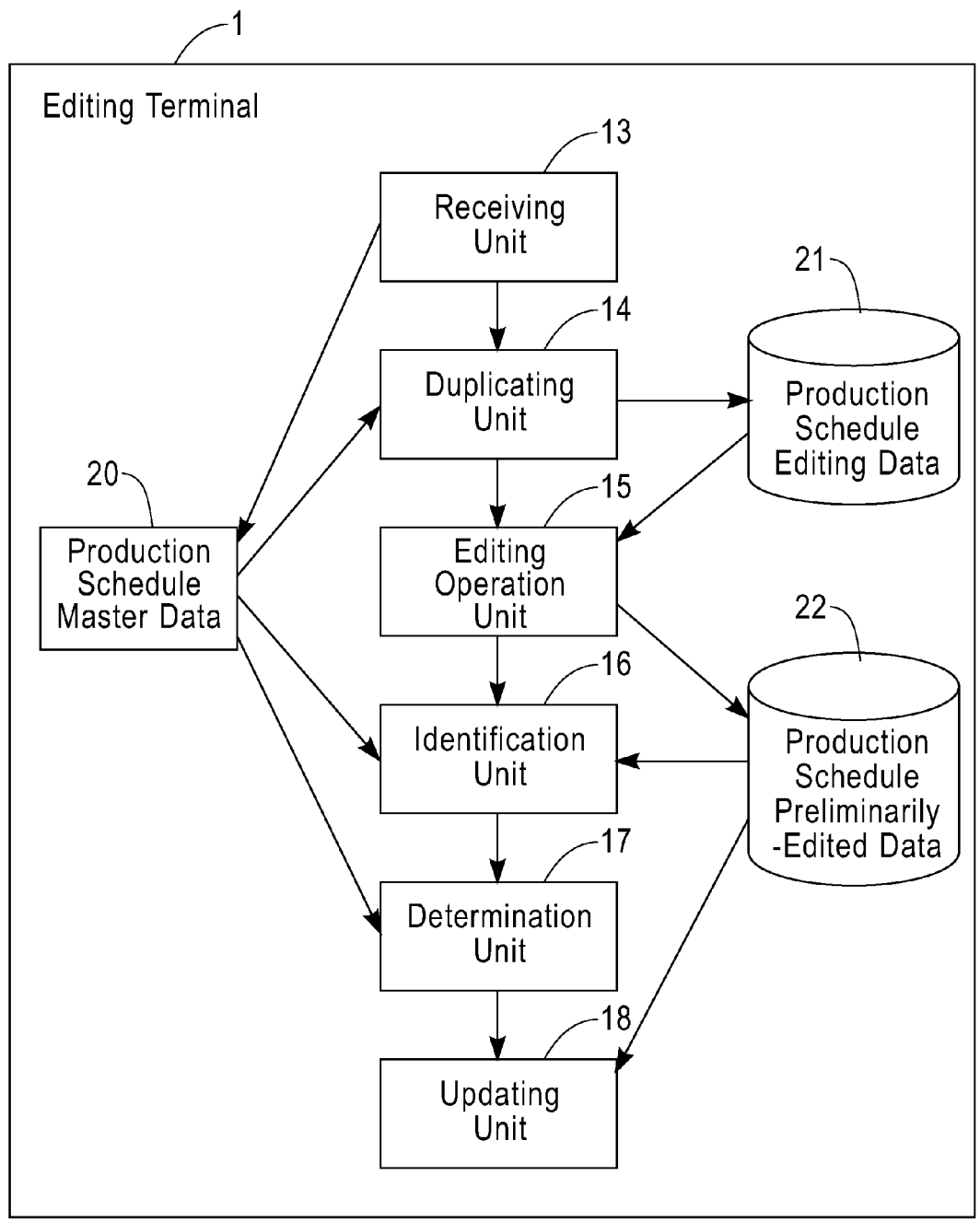
FIG. 2 is a diagram showing a functional configuration of an editing terminal according to the embodiment.

FIG. 2 is a diagram showing a functional configuration of the editing terminal according to the embodiment. The editing terminal 1 includes a receiving unit 13, a duplicating unit 14, an editing operation unit 15, an identification unit 16, a determination unit 17, and an updating unit 18.

The receiving unit 13 communicates with the production schedule data administration server 2 in accordance with the predetermined communication protocol and thereby receives the production schedule master data 20 stored in the production schedule data administration server 2. The received production schedule master data 20 is then stored in a predetermined storage region. It should be noted that the production schedule master data 20 is production schedule data in which items indicating products (including semi-finished products) are chronologically arranged, and the basis of which an editing process is performed.

The duplicating unit 14 generates production schedule editing data 21 by duplicating the production schedule master data 20 received by the receiving unit 13. It should be noted that the contents of the production schedule editing data 21 are the same as those of the production schedule master data 20.

The duplicating unit 14 stores the production schedule editing data 21 in a database for production schedule editing data. The production schedule editing data 21 is production schedule data in which an editor can actually edit the production schedule by operating the editing terminal 1.

The editing operation unit 15 edits all or part of multiple items shown by the production schedule editing data 21 on the basis of an inputted editing command, and thereby generates production schedule preliminarily-edited data 22. The editing operation unit 15 stores the production schedule preliminarily-edited data 22 in a database for production schedule preliminarily-edited data. It should be noted that the editing command is a command for instructing the computer to edit the production schedule, such as a command for instructing the computer to insert a new item into the production schedule, or to delete or move an item included in the production schedule.

Figure 6:
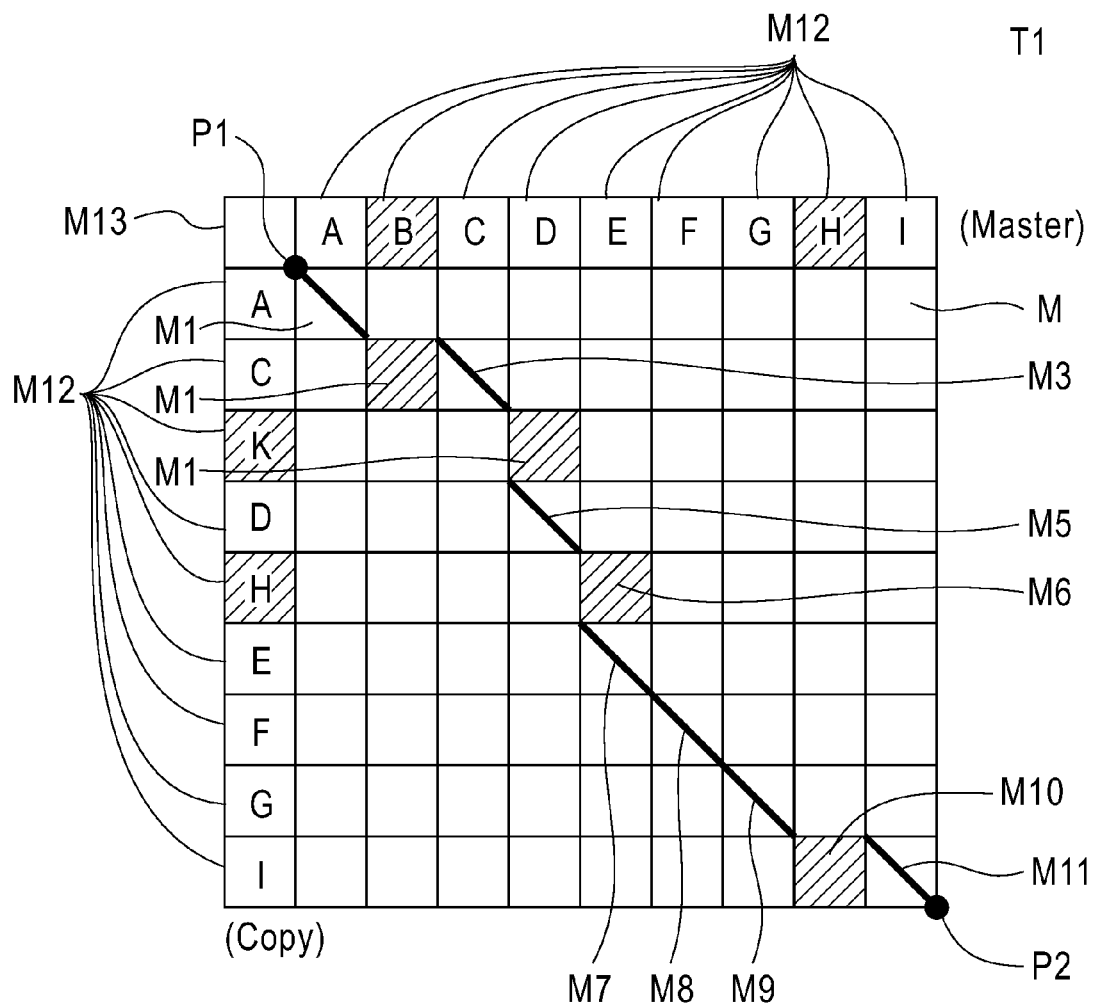
FIG. 6 shows an identification table, which is used for identifying an edited item.

The identification unit 16 includes an identification table T1 (see FIG. 6). On the basis of the production schedule preliminarily-edited data 22 and the production schedule master data 20, the identification unit 16 identifies an item that has been edited in the production schedule preliminarily-edited data 22 with respect to the production schedule master data 20.

In a case where, in the production schedule shown by the production schedule master data 20, tag information TG (see FIGS. 9 and 12) is appended to an item coinciding with the edited item identified by the identification unit 16, the determination unit 17 determines whether the editing command made for that item is valid or invalid.

The updating unit 18 generates the production schedule preliminarily-edited data 22 in which the editing command determined to be valid by the determination unit 17 with respect to the production schedule preliminarily-edited data 22 is reflected. Then, the updating unit 18 transmits the generated production schedule preliminarily-edited data 22 to the production schedule data administration server 2 by communicating with the production schedule data administration server 2 in accordance with the predetermined protocol. Thereby, the updating unit 18 updates the production schedule master data 20 by using the generated production schedule preliminarily-edited data 22.

Figure 3:
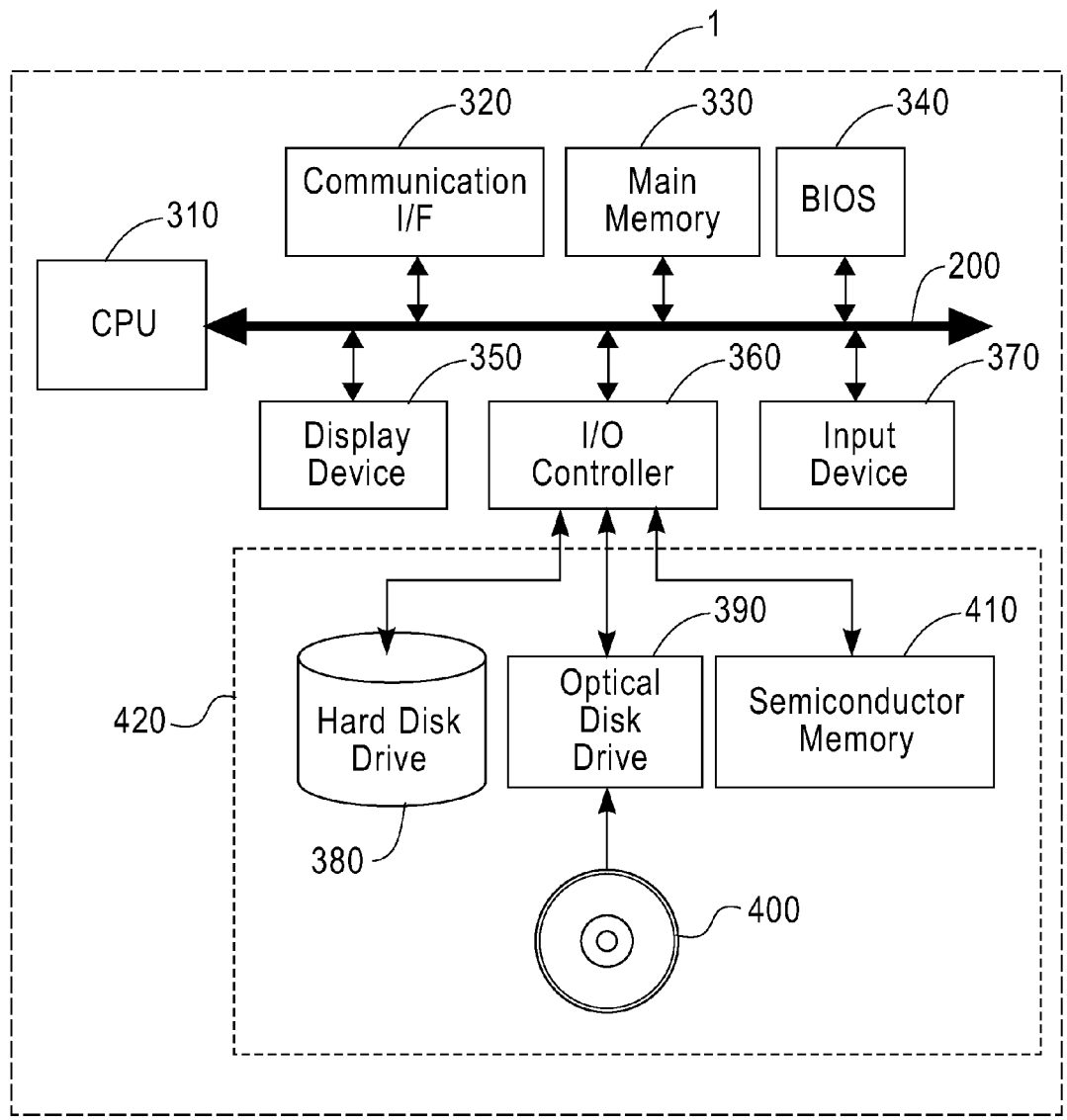
FIG. 3 is a diagram showing a hardware configuration of the editing terminal according to the embodiment.

FIG. 3 is a diagram showing a hardware configuration of the editing terminal 1 according to the embodiment. It should be noted that the production schedule data administration server 2 also has a configuration similar to that of the editing terminal 1.

The editing terminal 1 includes: a CPU (central processing unit) 310 constituting the control unit; a bus line 200; a communication I/F (interface) 320; a main memory 330; a BIOS (basic input output system) 340; a display device 350; an I/O controller 360; an input device 370, such as a keyboard or a mouse; a hard disk drive 380; an optical disk drive 390; and a semiconductor memory 410. Note that the hard disk drive 380, the optical disk drive 390, and the semiconductor memory 410 are collectively called a storage device 420.

The control unit 310 is a section that controls all over the editing terminal 1, and achieves various functions according to the present invention in association with the above-described hardware by reading out and executing various programs stored in the hard disk drive 380 as appropriate.

The communication I/F 320 is a network adaptor that allows the editing terminal 1 to transmit and receive information to and from the production schedule data administration server 2 or the like (see FIG. 1) via the communication network 3 (see FIG. 1). Examples of the communication I/F 320 include a modem, a cable modem, and an Ethernet adaptor.

The BIOS 340 stores a boot program executed by the CPU 310 when the editing terminal 1 is started up.

Examples of the display device 350 may include display devices, such as, a cathode ray tube (CRT) display device and a liquid crystal display (LCD) device.

The storage device 420, such as the hard disk drive 380, the optical disk drive 390, and the semiconductor memory 410, can be connected to the I/O controller 360.

The input device 370 allows an editor of the production schedule to input an editing command therethrough.

The hard disk drive 380 stores various programs that cause this hardware to function as the editing terminal 1 including: a program executing the functions of the present invention; a table, which will be described later; and a record. Note that the editing terminal 1 may use an external storage device, such as a hard disk drive (not illustrated) provided separately to the outside.

As the optical disk drive 390, for example, a DVD-ROM drive, a CD-ROM drive, a DVD-RAM drive, or a CD-RAM drive may be employed. In each case, an optical disk 400 that is compliant with the corresponding drive is used. A program or data may be read out from the optical disk 400 by use of the optical disk drive 390 and then loaded to the main memory 330 or the hard disk drive 380 via the I/O controller 360.

Note that the term "computer" used in the description of the present invention means an information processing apparatus including the storage device 420, the CPU 310, and the like. The editing terminal 1 is a configuration of the information processing apparatus including the storage device 420, the CPU 310, and the like, and the information processing apparatus is included in the concept of the computer of the present invention.

In this editing terminal 1, the CPU 310 mainly corresponds to the receiving unit 13, the duplicating unit 14, the editing operation unit 15, the identification unit 16, the determination unit 17, and the updating unit 18. In addition, the communication I/F 320 also corresponds to the receiving unit 13 and the updating unit 18. Moreover, the input device 370 also corresponds to the editing operation unit 15. The editing terminal 1 stores each of the production schedule master data 20, the production schedule editing data 21, and the production schedule preliminarily-edited data 22, in a predetermined corresponding storage region in the storage device 420.

Note that the editing terminal 1 may be achieved by any of various terminals including a cellular phone, a PDA (personal data assistant), and a video game machine as long as the principle of the present invention is applicable thereto.

Figure 4A:
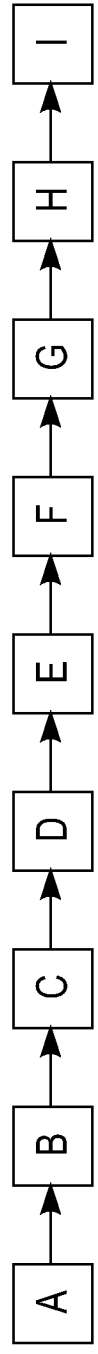
FIG. 4 shows an overview of production schedule data sets.
Figure 4B:
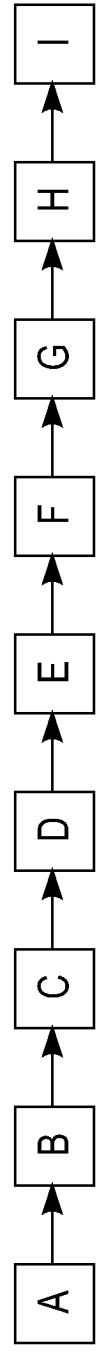
Figure 4C:
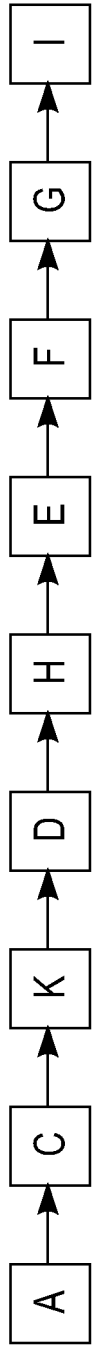

FIG. 4 shows an overview of the production schedule data sets. Parts (a), (b), and (c) of FIG. 4 show overviews of the production schedule master data 20, the production schedule editing data 21, and the production schedule preliminarily-edited data 22, respectively.

The production schedule master data 20 is, as has already been described, production schedule data showing multiple items chronologically arranged therein and the basis of which the editing process is performed. The production schedule master data 20 is used for the setting of the order of casts in a steel making process, the order of charges in a cast, the order of cycles in a hot-rolling process, the order of slabs in a cycle, the order of slabs in a charge, and the like.

The production schedule editing data 21 is, as has already been described, production schedule data in which an editor can edit the production schedule by operating the editing terminal 1. The production schedule editing data 21 is generated through the duplication of the production schedule master data by the duplicating unit 14.

The production schedule preliminarily-edited data 22 is production schedule data in which an editing command inputted by the editing operation unit 15 is reflected. This production schedule preliminarily-edited data 22 is, as will be described later, used in an event of finding which item is to be edited by an editor, and the like.

Next, an editing command line will be described. The editing command line means a command line formed of multiple aforementioned editing commands arranged therein.

Figure 5:
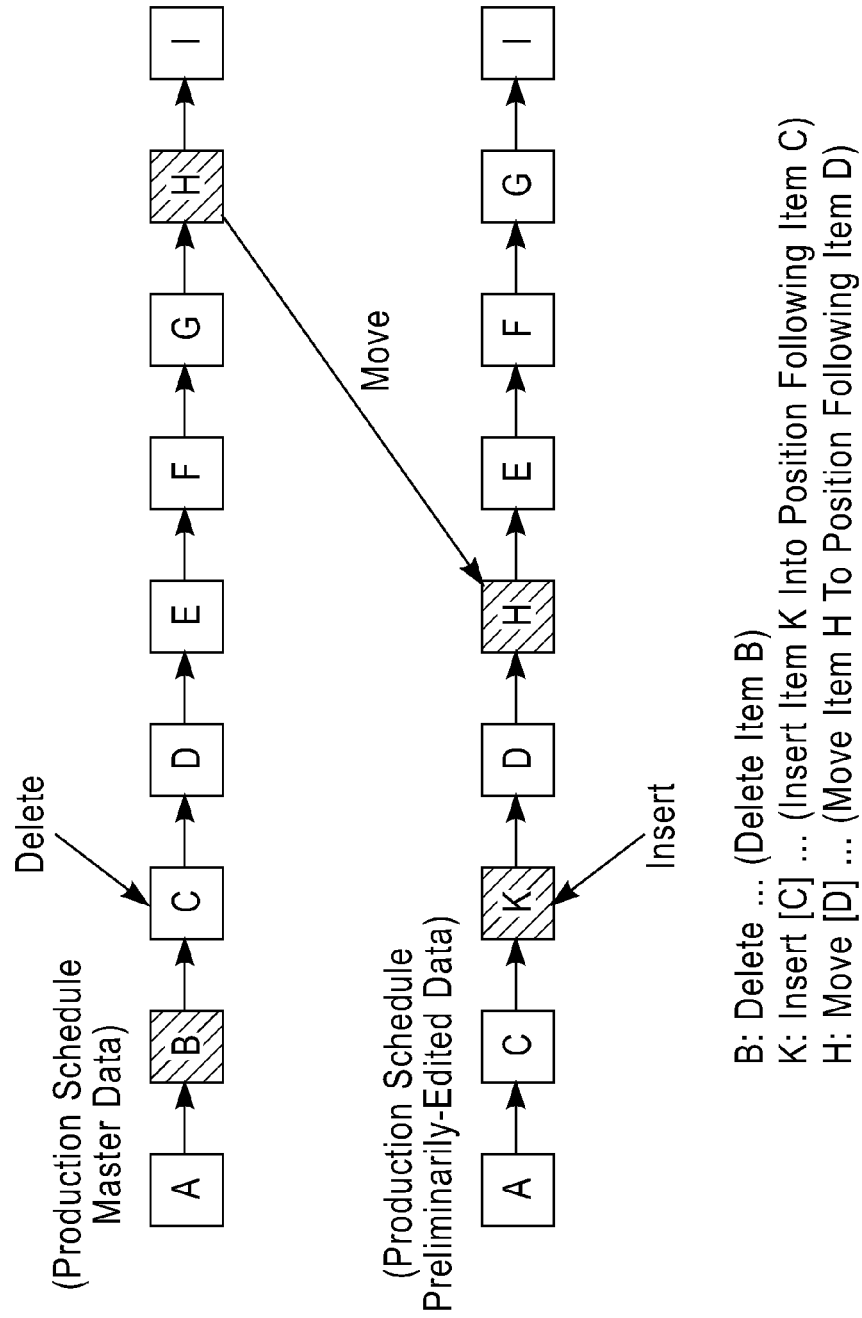
FIG. 5 shows an editing command line in a case where item input forms are not fixed.

FIG. 5 shows an editing command line in a case where item input forms are not fixed. It should be noted that the item input form is, as will be described later, a form which is fixed in advance in the production schedule data and into which an editor inputs contents of a product (or a semi-finished product). The production schedule master data 20 to be edited by means of such editing command line is used, as examples, for the setting of the order of casts in a steel making process, the order of charges in a cast, the order of cycles in a hot-rolling process, and the order of slabs in a cycle.

The editing command line shown in FIG. 5 is configured of three editing commands arranged therein.

"B: delete" is an editing command giving an instruction to delete the item "B." "K: insert [C]" is an editing command giving an instruction to insert the item "K" into a position following the item "C." "H: move [D]" is an editing command giving an instruction to move the item "H" to a position following the item "D."

It should be noted that if the editing commands "delete" and "insert" are given for the same item, these editing commands are re-defined as "move."

The editing command line as described above is reflected in the production schedule editing data 21, such that the production schedule preliminarily-edited data 22 as shown in FIG. 5 is generated.

FIG. 6 shows an identification table T1, which is used for identifying an edited item. Note that, as will be described in detail later, an identifying process for an edited item is executed twice. For this reason, two sets of production schedule master data 20 are prepared.

In the identification table T1, multiple grids M are arranged in a checkerboard pattern. A group of items (A to I) shown by the production schedule master data 20 and a group of items (A, C, K, D, H, E, F, G, I) shown by the production schedule preliminarily-edited data 22 are arranged on item-arrangement grids M12 located on the outer periphery of the checkerboard pattern of the multiple grids M. Specifically, these groups of items are arranged to be perpendicular to each other with a reference grid M13 being set as a starting grid.

The identification unit 16 determines whether or not items on perpendicular lines extending respectively to the production schedule master data 20 and the production schedule preliminarily-edited data 22 from each grid M coincide with each other. When determining that items on the respective perpendicular lines coincide with each other, the identification unit 16 draws a diagonal line on the grid M corresponding to the items. In this way, the identification unit 16 draws a diagonal line on each grid M corresponding to items coinciding with each other. Here, the diagonal line is drawn in parallel with a line extending from a reference point P1 to a vertex point P2 that is located opposite to the reference point P1 on the diagonal line of the checkerboard pattern. Sequentially, the identification unit 16 obtains the shortest path from the reference point P1 to the vertex point P2.

Examples of such an approach for obtaining the shortest path from the reference point P1 to the vertex point P2 include Dijkstra's algorithm for finding the shortest path. After obtaining the shortest path extending from the reference point P1 to the vertex point P2 by means of a shortest path algorithm, the identification unit 16 traces the shortest path from the reference point P1 to the vertex point P2. In this manner, when finding a grid M having a horizontal or a vertical part of the shortest path, the identification unit 16 identifies the item corresponding to the grid M in the production schedule preliminarily-edited data 22 as having been edited with respect to the production schedule master data 20.

In FIG. 6, the grids M1, M3, M5, M7 to M9, and M11 are grids each having a diagonal line drawn thereon before the execution of the shortest path algorithm. The identification unit 16 executes the shortest path algorithm in such a state where diagonal lines are drawn on the checkerboard pattern. From the shortest path thus obtained by means of the shortest path algorithm, it is found that the grids M1, M3, M5, M7 to M9, and M11 each have a diagonal part of the shortest path, while the grids M2, M4, M6, and M10 each have a horizontal or vertical part of the shortest path, as shown in FIG. 6.

The identification unit 16 identifies, as not having been edited, items corresponding to the grids M1, M3, M5, M7 to M9, and M11, each having the diagonal part of the shortest path in the production schedule preliminarily-edited data 22. Meanwhile, the identification unit 16 identifies as having been edited with respect to the production schedule master data 20 items located respectively on the perpendicular lines extending from the grids M2, M4, M6, and M10, each having a horizontal or vertical part of the shortest path, in the production schedule preliminarily-edited data 22.

It should be noted that the editor can visually check which item is to be edited by him/her self easily from the display device 350 (see FIG. 3), which displays the items identified as having been edited by the identification unit 16.

Performing the identifying process using the aforementioned identification table T1, the identification unit 16 can efficiently identify an item to be edited and an item not to be edited.

In addition, in the grid M2 the shortest path obtained by means of such shortest path algorithm extends in the horizontal direction (i.e. the direction in which the production schedule master data 20 is arranged). In the grid M4 the shortest path extends in the vertical direction (i.e. the direction in which the production schedule preliminarily-edited data 22 is arranged). Furthermore, the shortest path extends in the vertical direction in the grid M6, while extending in the horizontal direction in the grid M10.

Accordingly, the identification unit 16 identifies the items "B" and "H" corresponding respectively to the grids M2 and M10 as having been deleted in the production schedule preliminarily-edited data 22.

On the other hand, the identification unit 16 identifies the items "K" and "H" corresponding respectively to the grids M4 and M6 as having been inserted in the production schedule preliminarily-edited data 22.

As described above, in accordance with whether the shortest path extends in the horizontal direction or the vertical direction in each of the grids M2, M4, M6, and M10, the identification unit 16 identifies whether the corresponding item has been inserted or deleted. Accordingly, the identification unit 16 can easily identify whether each item has been inserted or deleted.

FIG. 7 shows another example of the editing command line.

The input item form is fixed in advance in the production schedule data, and an editor inputs content of a product (or a semi-finished product). When the item input forms are fixed, as in this case, the editing commands are employed as described below. The production schedule master data 20 to be edited by means of such editing command line is used, for example, for the setting of the order of slabs in a charge in a steel making process.

"B: delete" is an editing command giving an instruction to delete the item "B." "E: move [3]" is an editing command giving an instruction to move the item "E" into the third item input form from the top among all the items. "C: move [5]" is an editing command giving an instruction to move the item "C" to the fifth item input form from the top among all the items. "G: insert [7]" is an editing command giving an instruction to insert the item "G" into the seventh item input form from the top among all the items.

The editing command line, as described above, is reflected in the production schedule editing data 21 so that the production schedule preliminarily-edited data 22 as shown in FIG. 7 is generated.

The identification unit 16 compares the item input forms in the production schedule master data 20 with the item input forms in the production schedule preliminarily-edited data 22. Accordingly, the identification unit 16 can easily identify which item has been edited in the production schedule data wherein the item input forms are fixed in advance. Note that, as will be described later in detail, an identifying process for an edited item is executed twice. For this reason, as will be described below, two sets of production schedule master data 20, the basis of which the identifying process is executed, are prepared.

The identification unit 16 can identify that item "B" has been deleted, that the item "C" has been moved to the fifth form, that the item "E" has been moved to the third form and that the item "G" has been inserted into the seventh form. It should be noted that the editor can visually check which item is to be edited by him/her self easily from the display device 350 (see FIG. 3) displaying items identified by the identification unit 16.

FIG. 8 shows an overview of valid/invalid determination tables T2.

The determination unit 17 determines, by using the valid/invalid determination tables T2, whether the change of an item which is identified to be edited by the identification unit 16 is valid or invalid.

The valid/invalid determination tables T2 include a by-editor table T2 (#1), a by-schedule table T2 (#2), and a by-production-line table T2 (#3), in which priorities are assigned in accordance with editors, schedules, and production lines, respectively.

Figure 9:
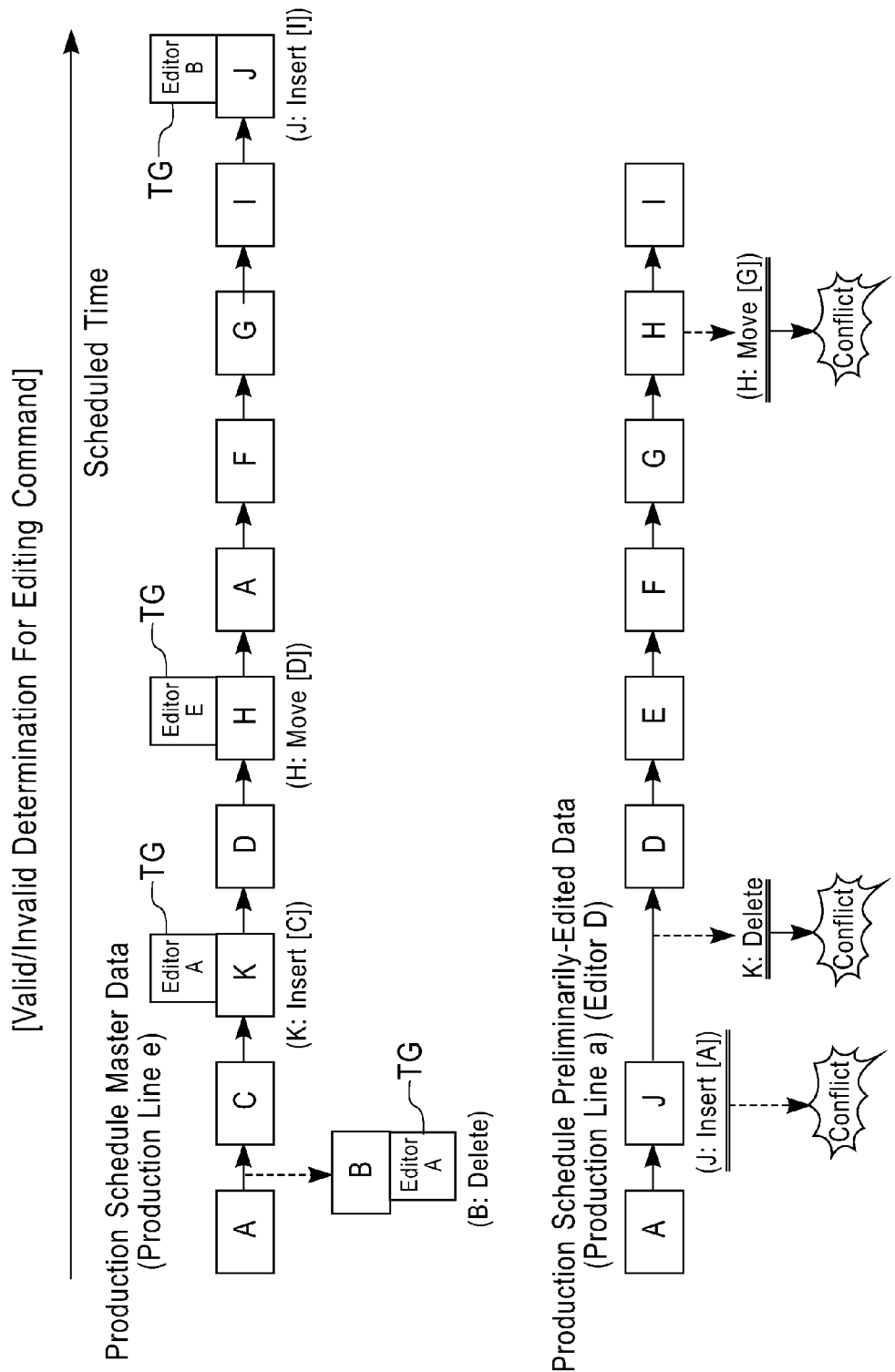
FIG. 9 shows an overview of a determination process by a determination unit to determine whether an editing command is valid or invalid.

FIG. 9 shows an overview of a determination process executed by the determination unit 17 to determine whether an editing command is valid or invalid.

In a case where, among items in the production schedule master data 20, tag information TG is appended to an item coinciding with the edited item identified by the identification unit 16, the determination unit 17 determines whether the editing command inputted for that item is valid or invalid.

In the production schedule master data 20 shown in FIG. 9, items are arranged in the order of "A," "C," "K," "D," "H," "E," "F," "G," "I," and "J" in accordance with the order of schedule, which is different from the initially prepared production schedule master data 20 (see Part (a) of FIG. 4) in the following points. Specifically, the item "B" has been deleted, the item "K" has been inserted into a position following the item "C," the item "H" has been moved to a position following the item "D," and the item "J" has been moved to a position following the item "I."

Meanwhile, tag information TG indicating an editor "A" is appended to the deleted item "B." Tag information TG indicating the editor "A" is appended to the inserted item "K." Moreover, tag information TG indicating an editor "E" is appended to the moved item "H." Further, tag information TG indicating an editor "B" is appended to the inserted item "J."

In addition, the production schedule master data 20 contains information on a production line for which the production schedule is designed to be executed. The production schedule master data 20 shown in FIG. 9 contains information indicating a "production line e."

On the other hand, in the production schedule preliminarily-edited data 22 shown in FIG. 9, items are arranged in the order of "A," "J," "D," "E," "F," "G," "H," and "I" in accordance with the order of schedule, which is different from the production schedule master data 20 in the following points. Specifically, the item "J" is scheduled to be inserted into a position following the item "A," the item "K" is scheduled to be deleted, and the item "H" is scheduled to be moved to a position following the item "H." Moreover, as in production schedule master data 20, the production schedule preliminarily-edited data 22 also contains information on a production line for which the production schedule is designed to be executed. The production schedule preliminarily-edited data 22 shown in FIG. 9 contains information indicating a "production line a."

The determination unit 17 has information on the names of editors concerned with the production schedule preliminarily-edited data 22. Specifically, the determination unit 17 can obtain information on the names of editors from login information or the like. Accordingly, the determination unit 17 can have information on the names of editors concerned with items identified to be edited in the production schedule preliminarily-edited data 22.

In a case where an item that coincides with the item identified to be edited in the production schedule preliminarily-edited data 22 exists in the production schedule master data 20, the determination unit 17 identifies the name of an editor concerned with the item existing in the production schedule master data 20 from tag information TG appended to the item in the production schedule master data 20.

Subsequently, the determination unit 17 determines which editor's edit is to be given priority, on the basis of the name of the editor concerned with the production schedule preliminarily-edited data 22 and the names of editors each identified from tag information TG. In this way, the determination unit 17 determines whether each editing command in the production schedule preliminarily-edited data 22 is valid or invalid. The determination unit 17 uses the by-editor table T2 (#1) of the valid/invalid determination tables T2 (see Part (a) of FIG. 8) for this determination.

In addition, the determination unit 17 uses the by-schedule table T2 (#2) (see Part (b) of FIG. 8) and the by-production-line table T2 (#3) (see Part (c) of FIG. 8) of the valid/invalid determination tables T2 in order to determine whether each editing command in the production schedule preliminarily-edited data 22 is valid or invalid.

An overview of the process of determining whether each editing command is valid or invalid will be described in detail below with reference to FIG. 10. FIG. 10 shows an overview of the process of determining whether each editing command is valid or invalid. It should be noted that this determination process is an example of the present invention, and thus the present invention is not limited to this example.

The determination unit 17 sequentially refers to the by-editor table T2 (#1), the by-schedule table T2 (#2), and the by-production-line table T2 (#3), of the valid/invalid determination tables T2, in order to determine whether each editing command is valid or invalid.

The determination unit 17 performs the following determination process in a case where the overview of the production schedule master data 20 and the production schedule preliminarily-edited data 22 is as shown in FIG. 9.

The determination unit 17 performs a determination process based on the names of editors indicated by tag information TG appended in the production schedule master data 20 and the name of the editor concerned with the production schedule preliminarily-edited data 22. In the by-editor determination process to be described below, the determination unit 17 can determine whether edit of an item is valid or invalid in accordance with the priority of each editor. For example, edit by an editor who controls multiple production lines may be given a higher priority than edit by editors each controlling only an individual production line. In this way, the production schedule can thus be set up from the perspective of the entire production site.

The by-editor determination process is as follows:

1. Regarding the editing command "J: insert [A]," determination cannot be made because the priorities of the editors D and B are equal;

2. Regarding the editing command "K: delete," it is determined that the editing command inputted by the editor D is invalid because the priority of the editor A is higher than that of the editor D; and 3. Regarding the editing command "H: move [G]," it is determined that the editing command inputted by the editor D is valid because the priority of the editor D is higher than that of the editor E.

The determination unit 17 performs a by-schedule determination process when the by-editor determination process is impossible. In the by-schedule determination process to be described below, the determination unit 17 can determine whether each editing command is valid or invalid in accordance with scheduled time. In this way, a production schedule more suitable for the conditions of the production site can be set up.

The by-schedule determination process is as follows:

1. Regarding the editing command "J: insert [A]," the editing command is determined to be valid because the priority of the order in the production schedule preliminarily-edited data 22 is higher than that of the order in the production schedule master data 20;

2. Regarding the editing command "K: delete," the determination cannot be made because the priority of the order in the production schedule preliminarily-edited data 22 is equal to that of the order in the productions-schedule master data 20; and 3. Regarding the editing command "H: move [G]," the editing command is determined to be invalid because the priority of the order in the production schedule preliminarily-edited data 22 is lower than that of the order in the production schedule master data 20.

The determination unit 17 performs a by-production-line determination process when the by-editor and by-schedule determination processes are impossible.

The by-schedule determination process is as follows:

1. Regarding all the editing commands "J: insert [A]," "K: delete," and "H: move [G]," these editing commands are determined to be valid because the priority of the production line a is higher than that of the production line e.

Note that, when a certain editing command cannot be determined to be valid or invalid even after the by-editor, by-schedule, and by-production-line determination processes are sequentially performed, the editing command may be determined to be invalid. As described above in detail, the determination unit 17 in this example determines whether an editing command is valid or invalid by sequentially performing the by-editor, by-schedule, and then by-production-line determination processes, in this order. The present invention is, however, not limited to this example, and may perform the determination with any combination of the validity determined by editor, the validity determined by schedule, and the validity determined by production line. For example, the determination unit 17 may determine that a certain editing command is valid only in a case where the editing command is determined to be valid in accordance with at least two of the criteria for determination, that is, by editor, by schedule, and by production line.

Figure 11:
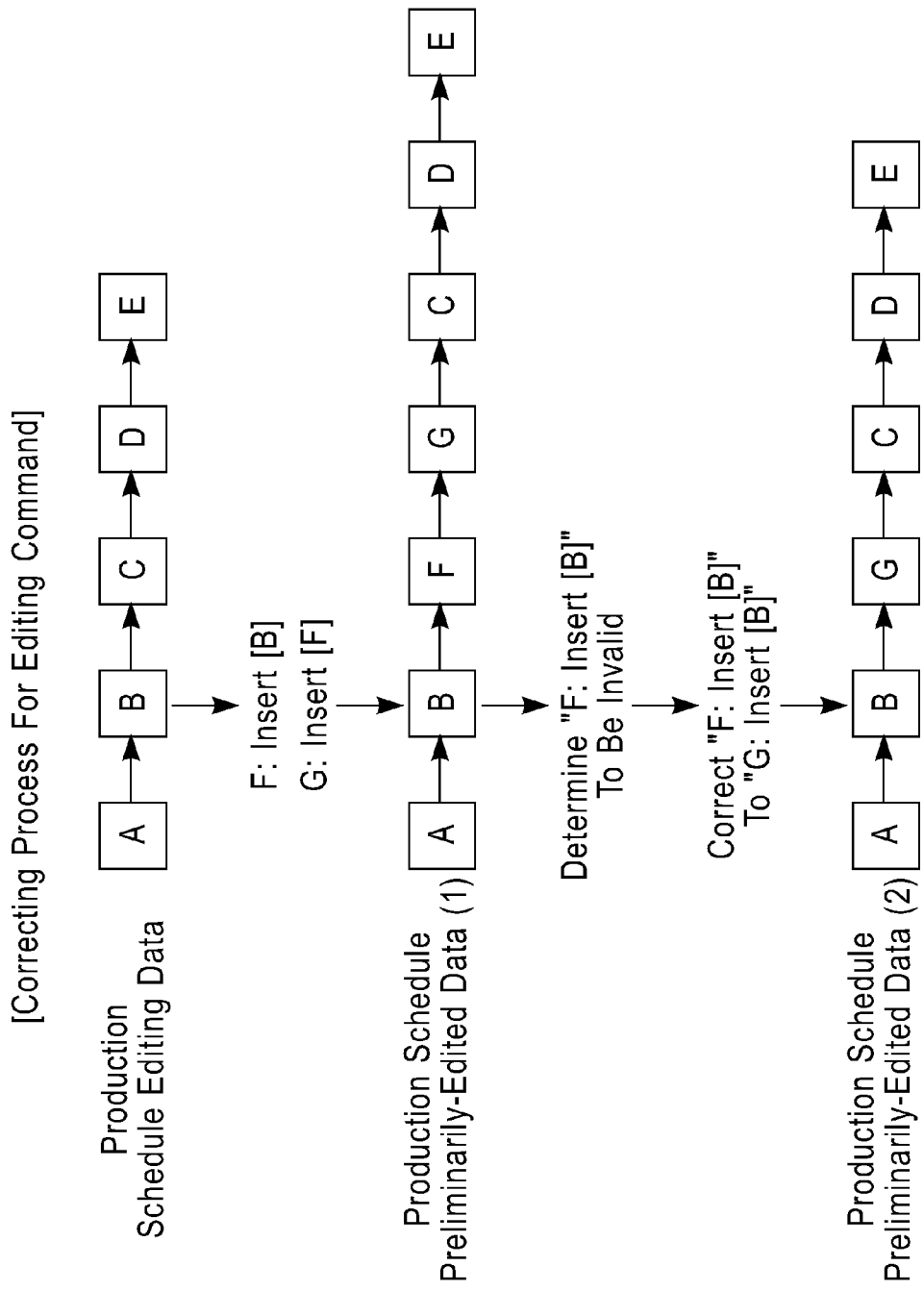
FIG. 11 shows an overview of a correcting process for an editing command that is determined to be valid.

FIG. 11 shows an overview of a correcting process for an editing command that is determined to be valid. Assume that the items are arranged in the order of "A," "B" "C," "D," and "E" in the production schedule editing data 21, and the editing commands to be reflected in the production schedule editing data 21 are "F: insert [B]" and "G: insert [F]." In this example, these editing commands are not sensibly reflected in the production schedule editing data 21 as they are. However, for convenience of description, the production schedule preliminarily-edited data 22 generated with these editing commands being reflected in the production schedule editing data 21 as they are is shown as production schedule preliminarily-edited data (1).

Consider a case where the editing command "F: insert [B]" is determined to be invalid while the editing command "G: insert [F]" is determined to be valid. In this case, since the editing command "G: insert [F]" is an editing command for inserting the item "G" into a position following the item "F," if the editing command "F: insert [B]" is not reflected, it cannot be determined which position the item "G" is to be inserted because the item preceding the position for the item "G" is uncertain.

When it cannot be determined which position the item "G" is to be inserted because the item preceding the position for the item "G" is uncertain, the updating unit 18 needs to give an instruction to insert the item "G" into a position following the item "B", which is not edited, before the result of the determination by the determination unit 17 is reflected in the production schedule editing data 21. For this reason, the updating unit 18 corrects the editing command "G: insert [F]" to an editing command "G: insert [B]."

When correcting an editing command as appropriate in this manner, the updating unit 18 can properly update the production schedule master data 20 even when another editing command is not reflected in the production schedule editing data 21.

Figure 12:
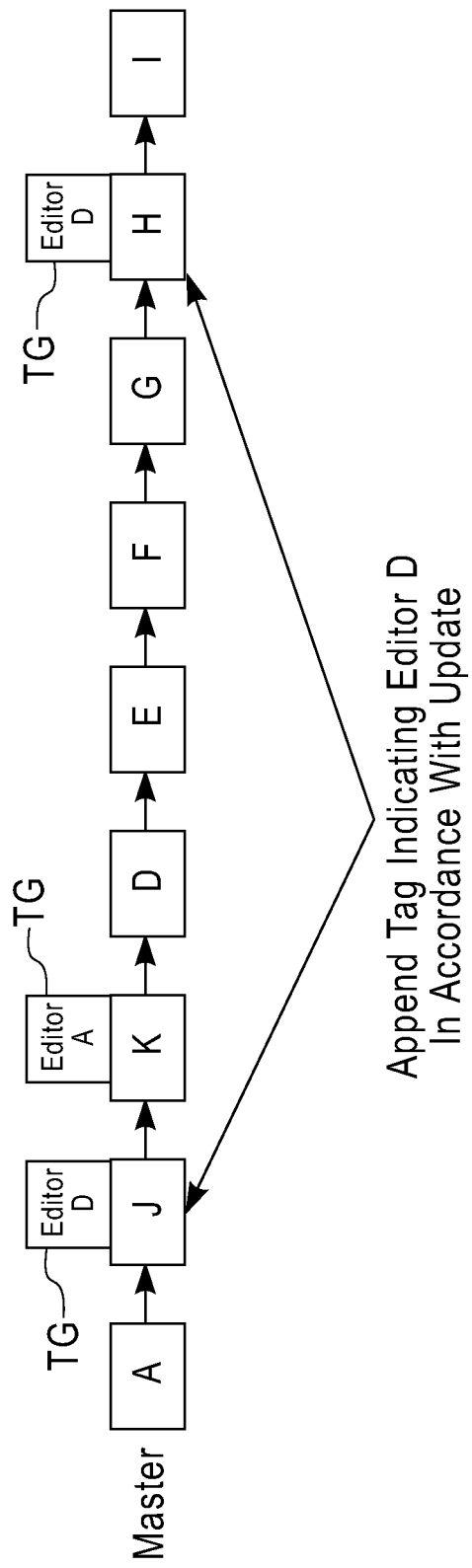
FIG. 12 shows an overview of an updating process for production schedule master data.

FIG. 12 shows an overview of an updating process for the production schedule master data 20. While deleting an editing command determined to be invalid, the updating unit 18 reflects an editing command determined to be valid, thereby generating the production schedule preliminarily-edited data 22. Incidentally, the updating unit 18 corrects the editing command determined to be valid as appropriate as described above.

The updating unit 18 updates the production schedule master data 20 by using the production schedule preliminarily-edited data 22 thus generated. In the update operation, the updating unit 18 appends tag information TG indicating an editor concerned with the production schedule editing data 21 to the corresponding editing command.

Because tag information TG indicating an editor concerned with the production schedule editing data 21 is appended in the updating process, the aforementioned determination process using tag information TG on whether an editing command is valid or invalid is performed in a case where another editor later edits the production schedule master data 20 thus updated. This makes it possible to prevent editing conflict with respect to the same item.

It should be noted that the following configuration may also be employed. Specifically, before the updating process is performed by using production schedule preliminarily-edited data generated with only an editing command determined to be valid being reflected therein, the display device 350 may display the production schedule preliminarily-edited data, thereby asking an editor to check whether or not the contents of the data are correct. In this case, if the editor disapproves of the contents, the editing operation is to be performed again.

Figure 13:
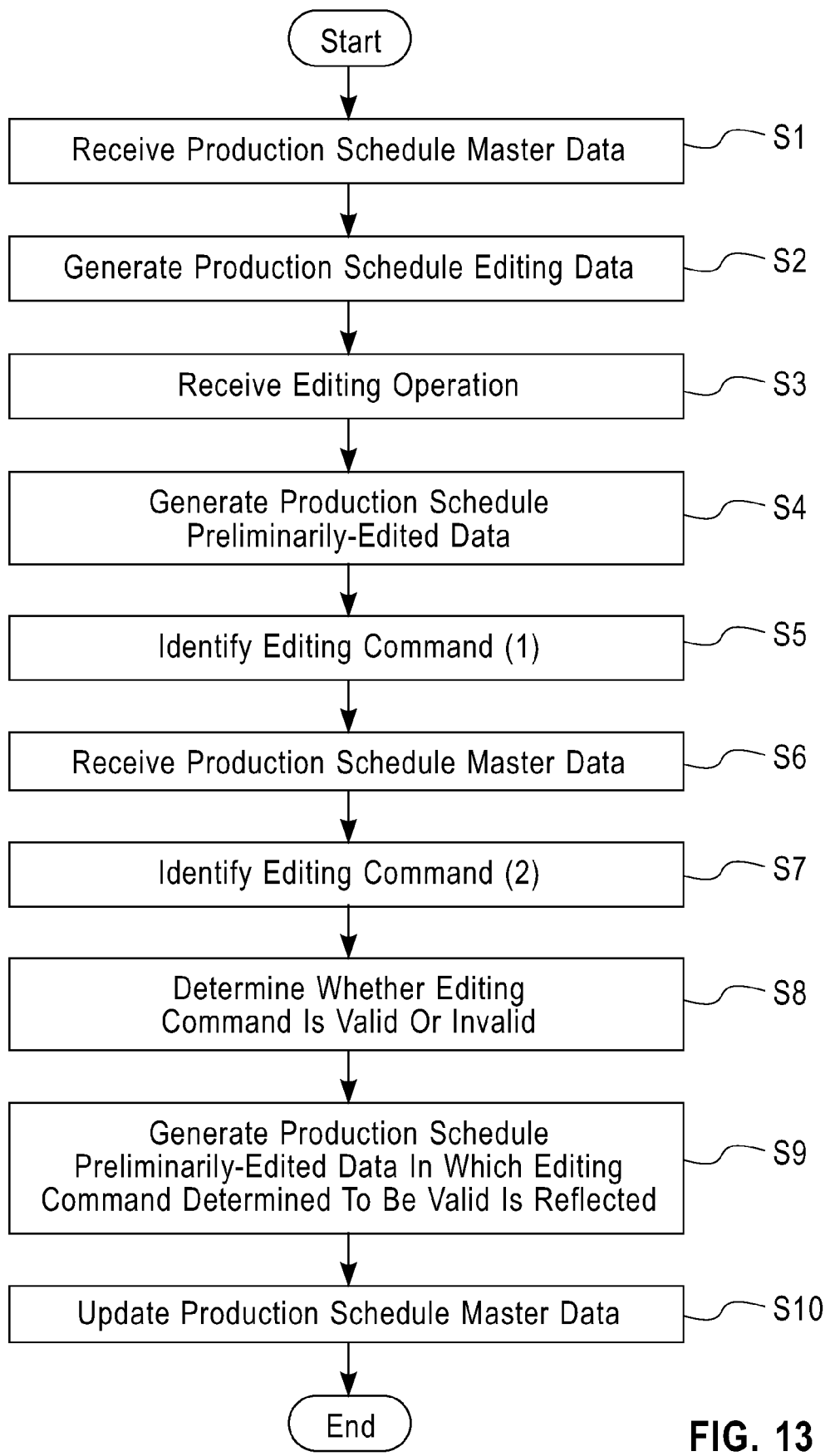
FIG. 13 shows a flowchart of the editing process for production schedule according to the embodiment.

FIG. 13 shows a flowchart of the editing process for production schedule according to an embodiment of the invention. This process is performed by the program of the editing terminal 1.

Step S1: The receiving unit 13 communicates with the production schedule data administration server 2, and thereby receives production schedule master data 20. Then, the receiving unit 13 stores the received production schedule master data 20 in a predetermined storage region in the storage device 420 (see FIG. 3).

Step S2: The duplicating unit 14 duplicates the production schedule master data 20, thereby generating production schedule editing data 21. The duplicating unit 14 stores the generated production schedule editing data 21 in a predetermined storage region in the storage device 420 (see FIG. 3). It should be noted that the contents of the production schedule editing data 21 are the same as those of the production schedule master data 20.

Step S3: The editing operation unit 15 receives an editing operation to be made on the production schedule editing data 21. The editor performs the editing operation by using a mouse, a keyboard, or the like.

Step S4: The editing operation unit 15 generates production schedule preliminarily-edited 22 data on the basis of the inputted editing command.

Step S5: The identification unit 16 compares the production schedule master data 20 with the production schedule preliminarily-edited data 22, thereby identifying which item is to be edited in the production schedule preliminarily-edited data 22 with respect to the production schedule master data 20. Note that such process of identifying an item to be edited is performed also in Step S7, which will be described later. For this reason, Step S5 is titled "Identify Editing Command (1)" in FIG. 13 for the sake of convenience.

Step S6: The receiving unit 13 again receives the production schedule master data 20 from the production schedule data administration server 2, and then stores the received production schedule master data 20 in a predetermined storage region in the storage device 420. The production schedule master data 20 stored at this event is used for the identification of an editing command performed in Step S7.

Step S7: The identification unit 16 again compares the production schedule master data 20 with the production schedule preliminarily-edited data 22, thereby identifying which item is to be edited in the production schedule preliminarily-edited data 22. This identifying process here is different, as will be described later, from the identifying process titled "Identify Editing Command (1)" performed in Step S5 described above. For this reason, Step S7 is titled "Identify Editing Command (2)" in FIG. 13 for the sake of convenience.

The identification unit 16 performs the identifying process in Step S7 in order to identify which item the editor is to edit with respect to the latest production schedule master data 20. This is because the production schedule master data 20 at the time when received in Step S1 may have been already edited by another editor.

Step S8: The determination unit 17 determines whether each editing command is valid or invalid on the basis of the production schedule master data 20 received in Step S6 and the production schedule preliminarily-edited data 22 generated in Step S4.

Step S9: The updating unit 18 generates production schedule preliminarily-edited data in which only an editing command determined to be valid in Step S8 is reflected, and updates the production schedule master data 20 by using the production schedule preliminarily-edited data thus generated.

Step S10: The updating unit 18 then communicates with the production schedule data administration server 2, thereby transmitting the updated data to the production schedule data administration server 2.

Note that the updating unit 18 may be configured to cause the display device 350 (see FIG. 3) to display the production schedule preliminarily-edited data 22 before the updating process. This configuration allows the editor to perform an authentication operation at this point of time. When the editor performs the authentication operation, the production schedule master data 20 is update with the production schedule preliminarily-edited data 22. On the other hand, when the editor performs a cancellation operation, the editing operation in Step S3 is again performed.

According to the present invention, an item edited in the production schedule preliminarily-edited data with respect to the production schedule master data is specified. Then, whether the editing of the specified item is valid or invalid is determined in relation to the current production schedule master data. Then, new production schedule master data in which only the editing determined to be valid is reflected is generated. Accordingly, in a case where multiple editors edit production schedule data including multiple items chronologically arranged therein, even when so-called editing conflict in which some of the multiple editors edit the same item occurs, the present invention can appropriately deal with the conflict.

With this configuration, even when multiple editors perform their editing operations simultaneously, each editor does not need to pay attention to the editing state of other editors in order to avoid editing conflict while performing his/her editing operation. Consequently, the editors can efficiently perform their editing operations.

Although the preferred embodiment of the present invention has been described in detail, it should be understood that various changes, substitutions and alternations can be made therein without departing from spirit and scope of the inventions as defined by the appended claims.

What is claimed is:

1. A method for editing a production schedule, comprising the steps of:

receiving production schedule master data;

duplicating the production schedule master data to generate production schedule editing data;

editing items in the production schedule editing data in response to an inputted editing command to generate production schedule preliminarily-edited data;

identifying an edited item corresponding to the production schedule preliminarily-edited data and the production schedule master data;

determining whether the inputted editing command is valid or invalid when, among items in the production schedule master data, tag information is appended to an item that is the same as the edited production schedule; and updating the production schedule master data by using the generated production schedule preliminarily-edited data in which the editing command determined to be valid is reflected and to which the tag information is appended, thereby producing an edited production schedule, wherein the identifying step further comprises the steps of:

using an identification table in which grids are arranged in a checkerboard pattern, and in which a group of the items shown by the production schedule master data and a group of the items shown by the production schedule preliminarily-edited data are arranged on item-arrangement grids to be perpendicular to each other with a reference grid being set as a starting grid and the item-arrangement grids being arranged on the outer periphery of the checkerboard pattern;

drawing a diagonal line in the grid when items on perpendicular lines extending respectively to the production schedule master data and the production schedule preliminarily-edited data from one of the grids coincide with each other and the diagonal line is drawn in parallel with a line extending from a reference point to a vertex point located at a position opposite to the reference point on the diagonal line of the checkerboard pattern;

obtaining a shortest path from the reference point to the vertex point by performing a shortest path algorithm for obtaining the shortest path; and tracing the obtained shortest path from the reference point to the vertex point so as to find a grid having a horizontal or a vertical part of the shortest path and identifies the item corresponding to the grid thus found in the production schedule preliminarily-edited data as having been edited with respect to the production schedule master data; and identifying whether the corresponding item is inserted or deleted in accordance with whether the shortest path extends in the horizontal direction or the vertical direction; and wherein at least one of the steps is carried out by using a computer device.

2. The method for editing a production schedule according to claim 1, wherein:

the determining step determines whether the inputted editing command is valid or invalid by determining a priority of an editor, wherein the priority of an editor is derived in accordance with: (i) names of editors indicated by the tag information appended in the production schedule master data; and (ii) names of the editors concerned with the production schedule preliminarily-edited data.

3. The method for editing a production schedule according to claim 1, wherein:

the determining step determines whether the inputted editing command is valid or invalid based on a scheduled time, wherein the scheduled time is appended to each of the items in each of the production schedule master data and the production schedule preliminarily-edited data.

4. The method for editing a production schedule according to claim 1, wherein:

the determining step determines whether the inputted editing command is valid or invalid based on a production line for which the production schedule is executed.

5. The method for editing a production schedule according to claim 1, further comprising the step of:

fixing item input forms in advance in each of the production schedule master data and the production schedule preliminarily-edited data;

wherein the identifying step compares the item input forms in the production schedule master data with the corresponding item input forms in the production schedule preliminarily-edited data and thereby identifies the item having been edited in the production schedule preliminarily-edited data with respect to the production schedule master data.

6. The method for editing a production schedule according to claim 1, further comprising the step of:

displaying the production schedule preliminarily-edited data generated by the updating step.

7. A system for editing a production schedule, comprising:

a computing device configured to:

receive production schedule master data;

duplicate the production schedule master data to generate production schedule editing data;

edit items in the production schedule editing data in response to an inputted editing command to generate production schedule preliminarily-edited data;

identify an edited item corresponding to the production schedule preliminarily-edited data and the production schedule master data by:

using an identification table in which grids are arranged in a checkerboard pattern, and in which a group of the items shown by the production schedule master data and a group of the items shown by the production schedule preliminarily-edited data are arranged on item-arrangement grids to be perpendicular to each other with a reference grid being set as a starting grid and the item-arrangement grids being arranged on the outer periphery of the checkerboard pattern;

drawing a diagonal line in the grid when items on perpendicular lines extending respectively to the production schedule master data and the production schedule preliminarily-edited data from one of the grids coincide with each other and the diagonal line is drawn in parallel with a line extending from a reference point to a vertex point located at a position opposite to the reference point on the diagonal line of the checkerboard pattern;

obtaining a shortest path from the reference point to the vertex point by performing a shortest path algorithm for obtaining the shortest path; and tracing the obtained shortest path from the reference point to the vertex point so as to find a grid having a horizontal or a vertical part of the shortest path and identifies the item corresponding to the grid thus found in the production schedule preliminarily-edited data as having been edited with respect to the production schedule master data; and identifying whether the corresponding item is inserted or deleted in accordance with whether the shortest path extends in the horizontal direction or the vertical direction;

determine whether the inputted editing command is valid or invalid when, among items in the production schedule master data, tag information is appended to an item that is the same as the edited production schedule; and update the production schedule master data by using the generated production schedule preliminarily-edited data in which the editing command determined to be valid is reflected and to which the tag information is appended, thereby producing an edited production schedule.

8. The system for editing a production schedule according to claim 7, wherein the computer device is further configured to:

determine whether the inputted editing command is valid or invalid by determining a priority of an editor, wherein the priority of an editor is derived in accordance with: (i) names of editors indicated by the tag information appended in the production schedule master data; and (ii) names of the editors concerned with the production schedule preliminarily-edited data.

9. The system for editing a production schedule according to claim 7, wherein the computer device is further configured to:

determine whether the inputted editing command is valid or invalid based on a scheduled time, wherein the scheduled time is appended to each of the items in each of the production schedule master data and the production schedule preliminarily-edited data.

10. The system for editing a production schedule according to claim 7, wherein the computer device is further configured to:

determine whether the inputted editing command is valid or invalid based on a production line for which the production schedule is executed.

11. The system for editing a production schedule according to claim 7, further comprising:
item input forms that are fixed in advance in each of the production schedule master data and the production schedule preliminarily-edited data;
wherein the computer device is further configured to compare the item input forms in the production schedule master data with the corresponding item input forms in the production schedule preliminarily-edited data and thereby identifies the item having been edited in the production schedule preliminarily-edited data with respect to the production schedule master data.

12. The system for editing a production schedule according to claim 7, further comprising:
a display device that displays the updated production schedule preliminarily-edited data.

13. The system for editing a production schedule according to claim 7, further comprising:
an editing terminal comprising the computer device; and
a production schedule data administration server configured to store the production schedule master data,
wherein the editing terminal and the production schedule data administration server are connected to each other via a communication network.

14. The system for editing a production schedule according to claim 13, wherein the editing terminal further comprises a display device.

15. A non-transitory computer program product tangibly embodying computer readable instructions which when implemented causes a computer to execute the steps of:
receiving production schedule master data;
duplicating the production schedule master data to generate production schedule editing data;
editing items in the production schedule editing data in response to an inputted editing command to generate production schedule preliminarily-edited data;
identifying an edited item corresponding to the production schedule preliminarily-edited data and the production schedule master data;
determining whether the inputted editing command is valid or invalid when, among items in the production schedule master data, tag information is appended to an item that is the same as the edited production schedule; and
updating the production schedule master data by using the generated production schedule preliminarily-edited data in which the editing command determined to be valid is reflected and to which the tag information is appended, thereby producing an edited production schedule,
wherein the identifying step further comprises the steps of:
using an identification table in which grids are arranged in a checkerboard pattern, and in which a group of the items shown by the production schedule master data and a group of the items shown by the production schedule preliminarily-edited data are arranged on item-arrangement grids to be perpendicular to each other with a reference grid being set as a starting grid and the item-arrangement grids being arranged on the outer periphery of the checkerboard pattern;
drawing a diagonal line in the grid when items on perpendicular lines extending respectively to the production schedule master data and the production schedule preliminarily-edited data from one of the grids coincide with each other and the diagonal line is drawn in parallel with a line extending from a reference point to a vertex point located at a position opposite to the reference point on the diagonal line of the checkerboard pattern;
obtaining a shortest path from the reference point to the vertex point by performing a shortest path algorithm for obtaining the shortest path; and
tracing the obtained shortest path from the reference point to the vertex point so as to find a grid having a horizontal or a vertical part of the shortest path and identifies the item corresponding to the grid thus found in the production schedule preliminarily-edited data as having been edited with respect to the production schedule master data; and
identifying whether the corresponding item is inserted or deleted in accordance with whether the shortest path extends in the horizontal direction or the vertical direction.

16. The computer program product according to claim 15, wherein:
the determining step determine whether the inputted editing command is valid or invalid by determining a priority of an editor,
wherein the priority of an editor is derived in accordance with: (i) names of editors indicated by the tag information appended in the production schedule master data; and (ii) names of the editors concerned with the production schedule preliminarily-edited data.

* * * * *